E. H. HAWLEY.
Coffee-Urn.
No. 222,402.                    Patented Dec. 9, 1879.
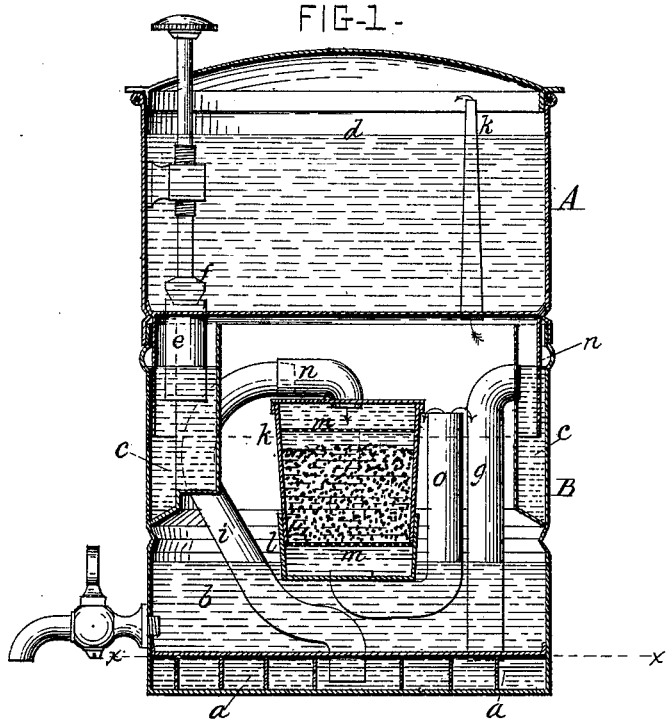
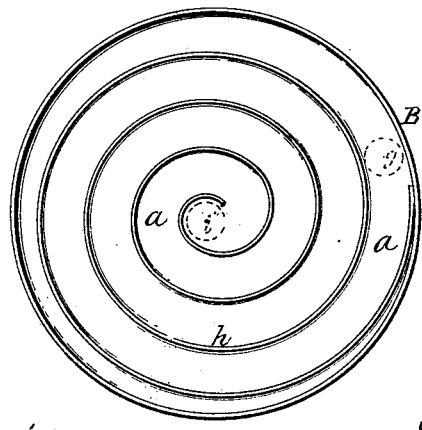
ATTEST =
Chas. M. Higgins
John E. Gavin
INVENTOR =
Edwin H. Hawley
by S. H. Wales Jr.
his attys.

UNITED STATES PATENT OFFICE.

EDWIN H. HAWLEY, OF NEW HAVEN, CONNECTICUT.

IMPROVEMENT IN COFFEE-URNS.

Specification forming part of Letters Patent No. 222,402, dated December 9, 1879; application filed October 15, 1879.

*To all whom it may concern:*

Be it known that I, EDWIN H. HAWLEY, of the city and county of New Haven, and State of Connecticut, have invented certain new and useful Improvements in Coffee-Urns, of which the following is a specification.

The aim of my improvements is to extract the full strength of the coffee, and also to retain its fresh flavor and aroma; and to these ends the main features of my invention may be stated to consist in constructing the urn with a cold-fresh-water reservoir, arranged above or around the liquid-coffee chamber, together with an isolated receptacle for the ground coffee, placed within the liquid-coffee receptacle, and a water-heating coil or passage, connected at one end with the water-reservoir and at the other with the coffee-receptacle, whereby a constant stream of fresh highly-heated water is caused to pass through the ground coffee, thus insuring the extraction of the full strength thereof, while the vapors rising from the coffee are condensed on the cold-water reservoir and returned, thus retaining the aroma, as hereinafter fully set forth.

Figure 1 in the annexed drawings presents a vertical section of my improved coffee-urn, and Fig. 2 a sectional plan on line $x\ x$, Fig. 1, showing the water-heating coil or chamber.

As illustrated in Fig. 1, the urn is, preferably, formed in two vertical sections or parts, A being the upper part, containing the water-reservoir, and B the lower part, containing the ground and liquid coffee receptacles, and also the water-heating coil or chamber, the upper part being arranged to fit down firmly over the top edge of the lower part, as shown.

The water-heating chamber $a$ is arranged in the bottom of the lower section, B, to which the heat is applied, while the space above this for about a third the height of the lower section forms the receptacle for the liquid coffee, as indicated by $b$. The lower section, B, is provided with an annular cold-water jacket, $c$, on its interior, and at its upper part above the level of the coffee, as illustrated. This jacket forms a continuation of the water-reservoir $d$, which is in the upper section, A, and a tube, $e$, from the reservoir dips into the jacket, as shown. The mouth of the tube is provided with a controlling-valve, $f$, provided with an operating-knob projecting above the urn, by which the outlet may be governed so as to allow a small stream of water to steadily trickle into the jacket, or by which this flow may be entirely shut off.

$k$ is a small vent-pipe between the top of the lower section, B, and the top of the water-reservoir.

A pipe, $g$, descends from near the top of the jacket $c$, and connects with the water-heating chamber $a$ in the base of the lower section, B, which chamber is, preferably, of a spiral form, as seen in Fig. 3, so that the water takes a long passage in a confined stream over the highly-heated surface before emerging, thus insuring its becoming highly heated. This spiral heating-chamber may be formed simply by a coil of pipe, or by a shallow chamber included between the true and false bottom of the section B, and formed into a long spiral chamber or chambers by a spiral partition, $h$, as illustrated in Figs. 1 and 2. The same effect, however, may be obtained by spirally corrugating the bottom; but the special way of forming the spiral is not essential; nor is a spiral passage itself essential to my invention, though much preferable.

The cold water from the jacket preferably enters the heating-chamber at the circumference, as illustrated, and, after traveling spirally over the heated bottom, is, preferably, discharged at the center through the pipe $i$, which, rising into the top of the coffee-chamber, curves downwardly and connects with the ground-coffee receptacle $k\ l$. This ground-coffee receptacle consists of two separable halves, $k\ l$, each provided with a perforated partition, $m\ m'$, between which the ground coffee is held. The receptacle is attached to the hot-water pipe $i$ by a tubular neck, $n$, which fits over the end of the pipe, as illustrated, so that when the upper section, A, of the urn is lifted from the lower section the receptacle $k\ l$ may be removed for filling or emptying. The discharge from the receptacle $k\ l$ takes place from the bottom thereof through the pipe $o$, which rises nearly to the top of the receptacle and terminates a little below the outlet $g$ from the jacket $c$.

It will now be observed that as the outlet from the jacket, which forms one end of the heating-coil, is a little higher than the outlet from the ground-coffee receptacle, which forms the terminal of the water-coil, the water will flow slowly through the heating-coil and through the coffee-receptacle, so that a constant stream of highly-heated fresh water will be discharged upon and flow through the ground coffee, thus securing the best solvent effect and insuring the full extraction of the coffee from the grounds.

It will also be observed that as the space above the liquid-coffee chamber $b$ is surrounded by the cold walls of the water-jacket $c$ and the bottom of the water-reservoir $d$, all the vapors rising from the coffee are condensed on these surfaces and trickle back into the coffee, thus preventing the escape of the aroma and retaining the flavor of the coffee in its full strength and freshness.

What I claim as my invention is—

1. A coffee-urn constructed with an elevated fresh-water chamber arranged in its upper portion, a heating chamber or coil arranged in its lower portion, a liquid-coffee receptacle intermediate between them, a connection from the water-reservoir to the heating-coil, and a receptacle for the ground coffee arranged on the discharging end of the coil and within the liquid-coffee receptacle, substantially as herein set forth.

2. The combination, in a coffee-urn, of a heating coil or chamber in the base thereof, a coffee-receptacle above the same, a jacket for the reception of cold fresh water arranged above the liquid-coffee receptacle, a connection from the cold-water jacket to the heating-coil, and a receptacle for the ground coffee on the discharging end of the heating-coil, substantially as herein shown and described.

EDWIN H. HAWLEY.

Witnesses:
R. C. NARAMORE,
E. A. HALE.